United States Patent [19]

McConnell

[11] 4,290,556

[45] Sep. 22, 1981

[54] PARALLEL ANGULARITY SENSOR FOR CENTER PIVOT IRRIGATION SYSTEM

[75] Inventor: Lloyd A. McConnell, Greeley, Colo.

[73] Assignee: Irrigation and Power Equipment, Inc., Evans, Colo.

[21] Appl. No.: 16,804

[22] Filed: Mar. 2, 1979

[51] Int. Cl.³ .............................................. B05B 3/02
[52] U.S. Cl. .................................. 239/177; 239/710; 239/720
[58] Field of Search ................ 137/344; 239/177, 212, 239/720, 710

[56] References Cited

U.S. PATENT DOCUMENTS

| | | | |
|---|---|---|---|
| 3,394,729 | 7/1968 | Bower et al. | 137/344 |
| 3,598,142 | 8/1971 | Neier | 137/344 |
| 3,606,160 | 9/1971 | Bordo et al. | 137/344 |
| 3,704,827 | 12/1972 | Moulton | 239/177 |
| 3,738,687 | 6/1973 | Zimmerer et al. | 137/344 |
| 3,983,898 | 10/1976 | Zimmerer et al. | 239/177 |
| 4,034,778 | 7/1977 | Sage et al. | 137/344 |
| 4,041,975 | 8/1977 | Ames | 239/177 |
| 4,073,309 | 2/1978 | Fraser et al. | 137/344 |
| 4,085,771 | 4/1978 | Hunter | 137/344 |
| 4,149,570 | 4/1979 | Hunter | 137/344 |
| 4,161,185 | 7/1979 | McConnell | 137/344 |

Primary Examiner—Martin P. Schwadron
Assistant Examiner—A. Michael Chambers
Attorney, Agent, or Firm—Poms, Smith, Lande & Rose

[57] ABSTRACT

An angularity sensor is disclosed for incorporation within center pivot irrigation systems for providing a signal to respective controllers controlling the rotational driving force of respective span units in response to angular deviation between adjacent span units. The angularity sensor disclosed resists erroneous signals from roll, pitch, longitudinal extensions and contractions, and traverse dislocations between adjacent span units. It responds only to angular deviations between adjacent span units regardless of the other movements caused by the terrain being traversed. Parallel extensible members under tension are attached to opposite sides of one span unit and connected on the opposite end to a horizontal member rotatably mounted for rotation in a horizontal plane on the opposite span member. The rotatable member is connected to the input of the controller whereby only rotational forces of the rotating member are transmitted to the controller as angularity deviation signals. All other movements are absorbed by the extensible members.

6 Claims, 16 Drawing Figures

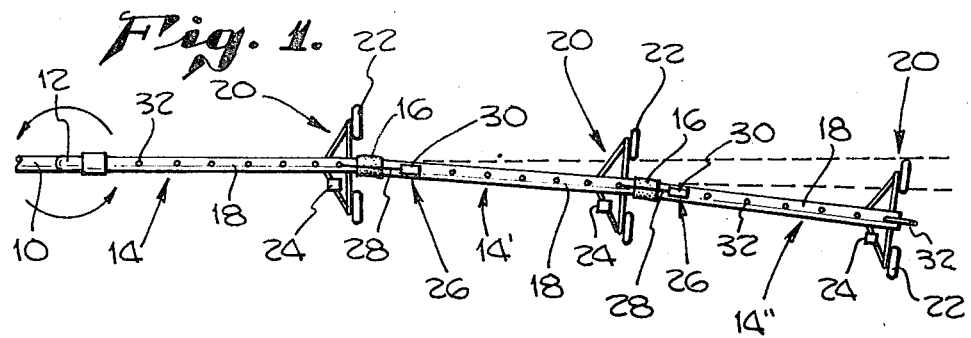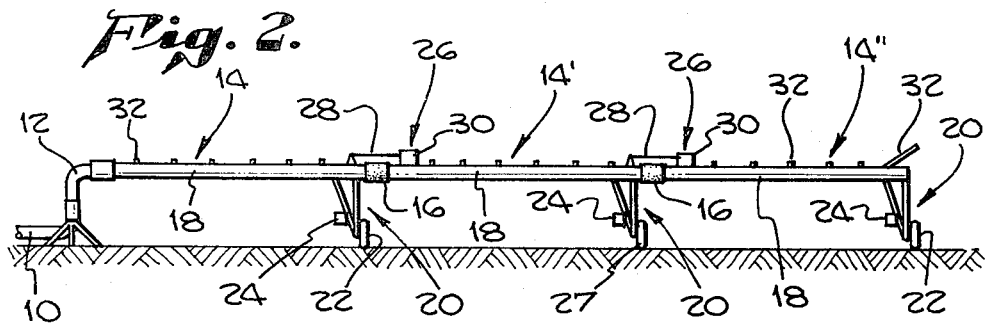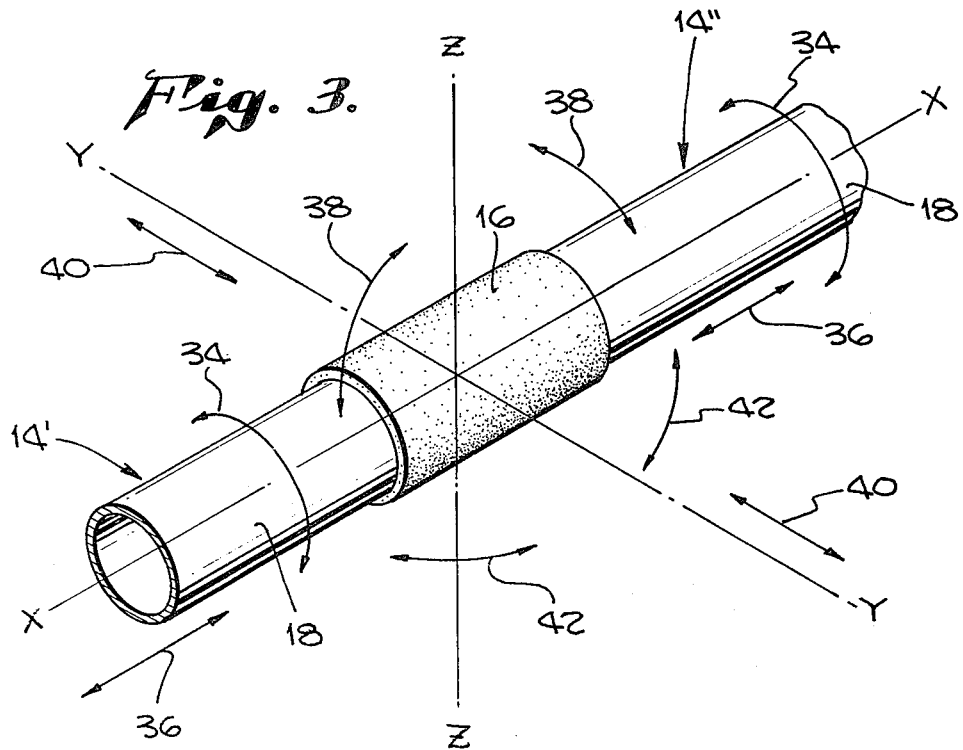

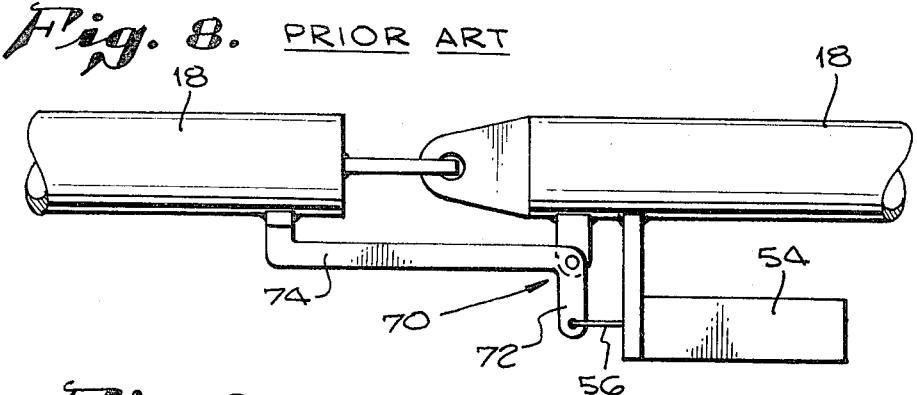
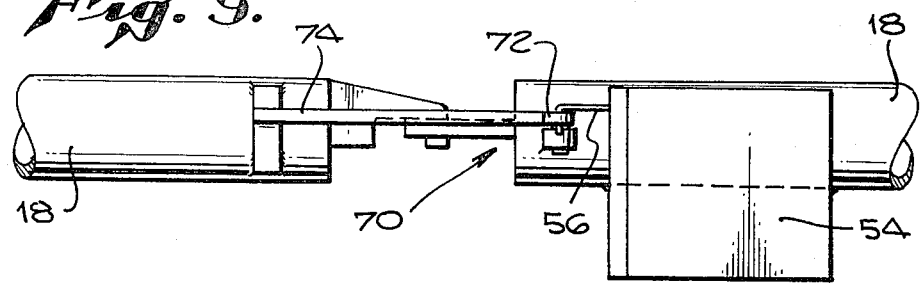
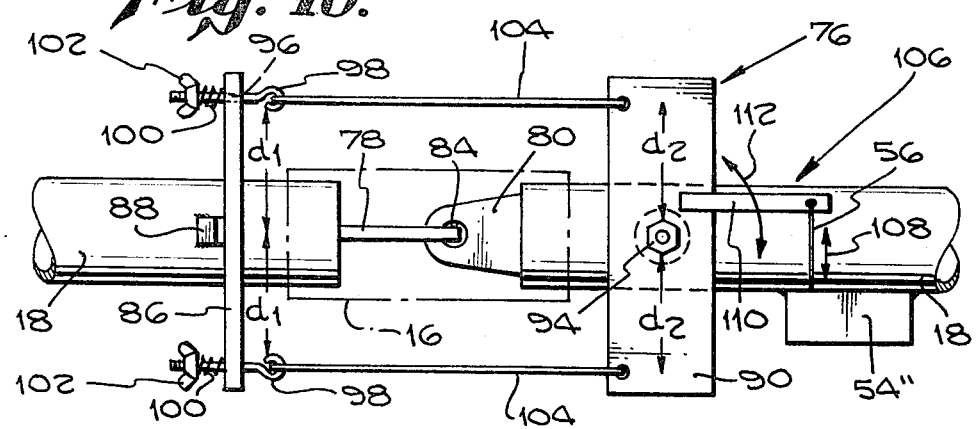

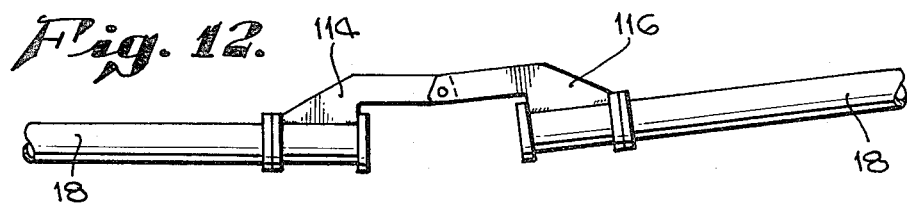
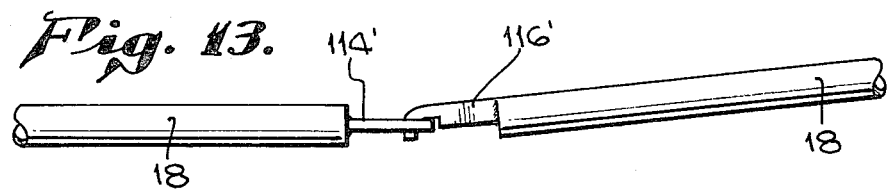
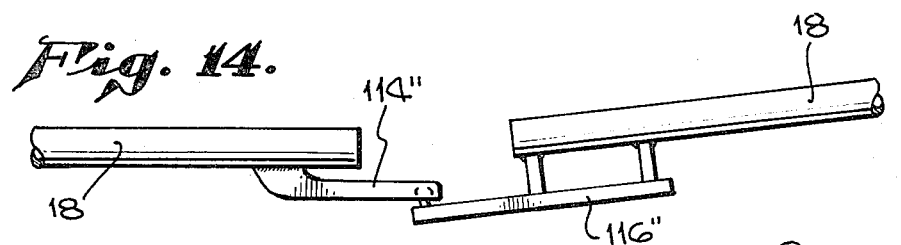
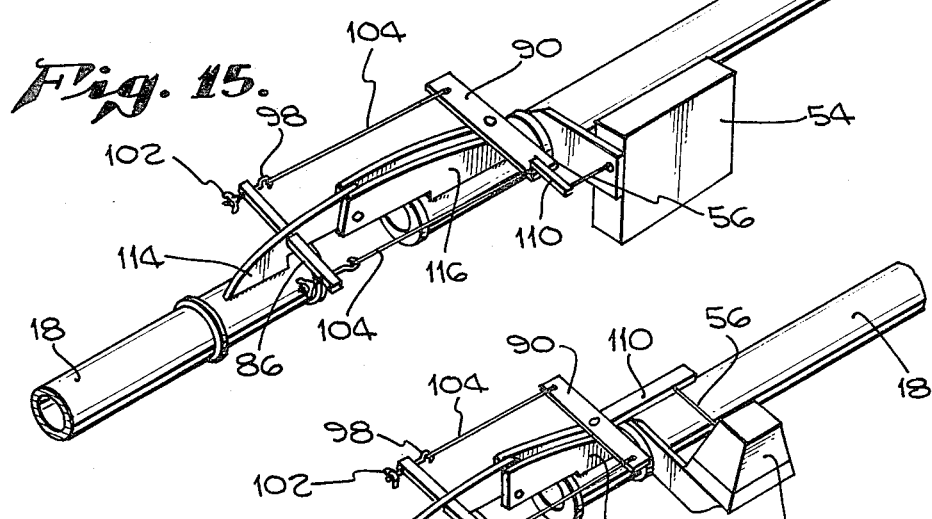
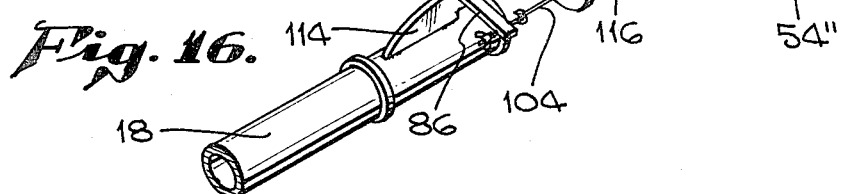

PARALLEL ANGULARITY SENSOR FOR CENTER PIVOT IRRIGATION SYSTEM

BACKGROUND OF THE INVENTION

The present invention relates to center pivot irrigation systems and more particularly to angularity sensors incorporated therein to sense the angular deviation in the horizontal plane between adjacent span units to provide a signal proportional thereto to the controller controlling the movements of each span unit as it rotates about the center pivot whereby the plurality of articulated span units comprising the irrigation system are maintained in substantially preselected alignment as they rotate about the center pivot.

A center pivot irrigation system is shown in FIGS. 1 and 2 in top and side elevation views, respectively. In such a system, a fixed supported pipe 10 has a rotating pipe 12 mounted on one end with the opposite end connected to a source of water under pressure. A plurality of span units 14, 14' and 14", are connected end to end extending from the rotating pipe 12. Each pair of adjacent span units is interconnected by a flexible cylindrical boot 16. Each span unit comprises a substantially horizontal conduit 18 supported on the outboard end by a support tower 20 having wheels 22 thereon which are driven by a motor 24. At each junction between adjacent span units, a control mechanism, generally indicated as 26, is provided which provides a control signal proportional to the angular deviation between the adjacent span units. This control signal is used to control the motor 24 driving the wheels 22 associated with the inboard support tower 20. Each control mechanism 26 comprises an angularity sensor 28 connected to a controller 30 which, in turn, is connected to the associated motor 24. A plurality of sprinklers 32 are connected into the conduit 18 to disperse the water over the area being traversed as the span units 14, 14' and 14" revolve about the fixed support pipe 10.

Referring now to FIG. 3, the junction between two adjacent span units (for example 14' and 14") is shown. If the ground being traversed were a completely horizontal plane, angularity sensing to maintain the span units in a preselected state of alignment would be no problem. Unfortunately, agricultural land is more typically full of ruts, hills, etc. which impart a number of undesired forces on the span units. In FIG. 3, the axis X—X is the longitudinal axis concentrically through the conduit 18 of span units 14', 14" in perfect alignment. The line Y—Y is the line normal to line X—X passing through the midpoint of the junction of the two span units 14', 14". Line Y—Y, therefore, is also the tangent in the horizontal plane of the circle traversed by the junction between span units 14', 14" at the midpoint of their junction. Line Z—Z represents a line normal to both lines Y—Y and X—X and is, therefore, the vertical direction. A plane containing both lines Y—Y and X—X is, therefore, a horizontal plane when line Z—Z is normal to the earth's surface.

With reference to these lines then, one can see that the two conduits 18 can roll about their longitudinal axis (i.e. line X—X) as represented by the arrows 34. They can roll in the same direction equally or unequally or can roll in opposite directions. Likewise, because of linkages in the mechanical joining of the adjacent span units (not shown) and the flexibility of boot 16, the two conduits 18 can move toward and away from one another along line X—X as represented by the arrows 36. This is a longitudinal movement at the junction. A pitching movement is caused by relevant rotation between the two adjacent span units 14', 14" in the X-Z plane as indicated by the arrows 38. Likewise, again because of looseness in the mechanical linkage and the flexibility of the boot 16, there can be relative traverse movement along the line Y—Y as indicated by the arrows 40. Finally, there can be an angular displacement in the X-Y plane as indicated by the arrows 42. Of the five motions possible, individually and/or in combination, it is this latter angularity motion indicated by the arrows 42 which is the only one to which it is desired that the control system respond.

Several prior art angularity sensing systems are shown in FIGS. 4 through 9. In the system shown in top and side views in FIGS. 4 and 5, respectively, the conduits 18 are mechanically linked by members 44 and 46 with pin 48 disposed in hole 50. Lever arm 52 extends laterally from one conduit 18 and control unit 54 is mounted laterally extended in the same direction in the horizontal plane from the other conduit 18. A rigid control rod 56 is pivotally connected on one end to lever arm 52 and passes into control unit 54 on the opposite end. As the distance between lever arm 52 and control unit 54 changes due to positional changes between the two conduits 18, control rod 56 moves into and out of control unit 54 causing a change in the control signal therefrom. As an examination of the apparatus of FIGS. 4 and 5 will disclose, in addition to being sensitive to the angular motion of interest, this apparatus is also sensitive to roll, roll and pitch in combination, pitch (if the lever arm 52 is not placed close adjacent to the joint), and longitudinal slack.

Another popular prior art system is shown in FIGS. 6 and 7 in top and side views respectively. The connecting members 58 and 60 are provided with a ball and socket joint generally indicated at 62. A pair rigid arms 64 extend outwardly in opposite directions at the point of the ball and socket joint 62 lying in a horizontal plane. A flexible cable 66 extends from the end of one arm 64 around a spindle 68 to the end of the opposite arm 64 where it is connected. Spindle 68 is a rotating spindle connected as the input medium to the control unit 54'. As the two conduits 18 change position, spindle 68 is rotated by the flexible cable 66 to provide the appropriate change in signal from controller 54'. While this apparatus is responsive to the angular motion of interest, inspection will also reveal that it is sensitive, additionally, to transverse slack and a combination of pitch and roll.

Still another prior art system is shown in FIGS. 8 and 9 in top and side views respectively. In this system, a sensor arm, generally indicated as 70, is pivotally mounted on the conduit 18 having the control unit 54 mounted thereon. Sensor arm 70 is generally L-shaped. The arm portion 72 adjacent control unit 54 is connected thereto by a rigid control rod 56 in the manner of the apparatus of FIGS. 4 and 5. The other arm portion 74 of sensor arm 70 is an extended member which extends across the junction of members 44, 46 to contact the opposite conduit 18. Changes in angularity are, therefore, transmitted through sensor arm 70 to control rod 56 and thence to control unit 54. Since arm portion 74 is in rotatable and sliding contact with the opposite conduit 18, many of the problems of undesired signals from extraneous movement of the span units are eliminated which were associated with the apparatus described above. As will be seen, however, transverse slack still causes the apparatus of FIGS. 8 and 9 to produce erroneous angularity signals.

Wherefore, it is the object of the present invention to provide an angularity sensor for incorporation in such center pivot irrigation systems which is responsive only to changes in angularity in the horizontal direction between adjacent span units to thereby provide an accurate input to the control unit controlling the motors driving the respective span units.

SUMMARY

The foregoing objective has been met in a center-pivot irrigation system having a plurality of interconnected span units revolving in articulated relationship about a center pivot with each span unit comprising a water-carrying conduit supported on one end by a wheeled support tower driven by a motor under the control of a control unit having a movable input connected to be responsive to the angular deviation in a horizontal plane between the span unit having the motor and the next adjacent span unit closer to the center pivot by the improved angularity sensor for providing an angularity signal to the controller comprising a first rigid bar member attached adjacent one end of one span unit conduit to extend normal to the longitudinal axis of the one span unit conduit equally in opposite directions in the horizontal plane when the one span unit is revolving in a horizontal plane; a second rigid bar member rotatably attached adjacent the abutting end adjacent the first rigid bar of the next adjacent span unit conduit to the one span unit conduit for rotation in the horizontal plane and extending normal to the longitudinal axis of the next adjacent span unit conduit equally in opposite directions in the horizontal plane; a pair of first connecting means for pivotally interconnecting respectively ends of the first and second bar members extending from the span unit conduits in the same direction, the first connecting means holding the first and second bar members under substantially equal tension forces on each side and being extensible and retractible under equal tension forces; and, second connecting means for interconnecting the second rigid bar member to the movable input of the controller to move the input in proportion to rotational movement of the second bar member corresponding to changes in angular deviation between the two adjacent span units.

DESCRIPTION OF THE DRAWINGS

FIG. 1 is a top view of a center pivot irrigation system as wherein the present invention is employed.

FIG. 2 is a side elevation of the center pivot irrigation system of FIG. 1.

FIG. 3 is a view of the junction of two adjacent span units in a center pivot irrigation system showing the various possible movements which can be encountered between adjacent span units.

FIG. 8 is a plan view of yet another prior art angularity sensor apparatus.

FIG. 9 is a side elevation of the apparatus of FIG. 8.

FIG. 10 is a plan view of angularity sensor apparatus according to the present invention.

FIG. 11 is a side elevation of the apparatus of FIG. 10.

FIG. 12 depicts one type of mechanical joining of adjacent span units employed in center pivot irrigation systems wherein the joining is above the water carrying conduits.

FIG. 13 shows the mechanical joining of adjacent span units wherein the mechanical joining takes place along the center line of the water carrying conduits.

FIG. 14 shows the mechanical joining of adjacent span units with the mchanical joining taking place below the water carrying conduits.

FIG. 15 is an orthographic view of the angularity sensor of the present invention in one embodiment as employed with mechanical joining apparatus as shown in FIG. 12.

FIG. 16 shows another embodiment of the present invention possible when employed with mechanical joining apparatus as shown in FIG. 12.

DESCRIPTION OF THE PREFERRED EMBODIMENT

Figure 4:
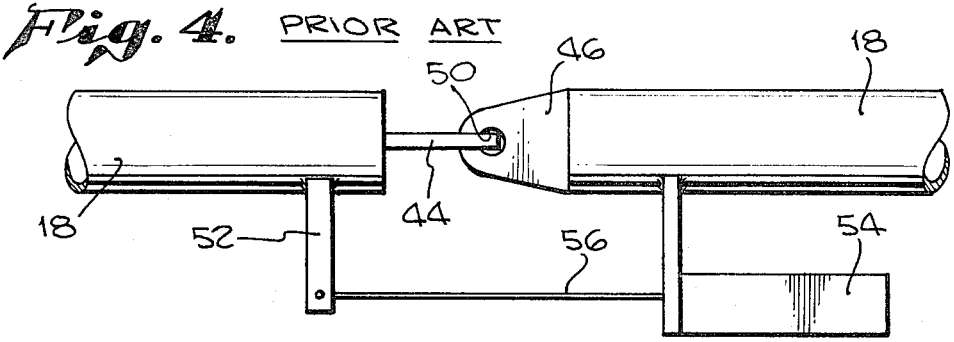
FIG. 4 is a plan view of an angularity sensor system according to the prior art.

Referring now to FIGS. 10 and 11, the angularity sensor of the present invention, indicated generally as 76, is shown. In this embodiment, the two conduits 18 are joined mechanically below the conduits 18 by members 78 and 80 having a pin 82 on one member disposed in a hole 84 on the opposite member. For continuity of water flow, the conduits 18 would, of course, be connected by a flexible cylindrical boot 16 as indicated in ghosted fashion in the drawing. A first rigid horizontal bar is attached to conduit 18, as by welding to post 88. Bar 86 extends horizontally at right angles to conduit 18 equally in opposite directions. A second rigid horizontal bar is pivotally mounted on post 92 on the opposite conduit 18 such that both first and second bars 86, 90 are in the horizontal plane with second horizontal bar 90 free to rotate in the horizontal plane about pivot point 94. First rigid horizontal bar 86 has a hole 96 therethrough along a line parallel to conduit 18 on each end at equal distances $d_1$ from the center. A pair of threaded eye bolts 98 are passed through respective ones of holes 96 and provided with springs 100 and wing nuts 102 so as to cause eye bolts 98 to be drawn away from the junction of the two conduits 18 against first rigid horizontal bar 86 by the compressive force of springs 100. Each eye bolt 98 is connected to the same side of the second rigid horizontal bar 90 at a distance $d_2$ from the center thereof as with equal lengthed cables 104 as shown in FIG. 10. In the preferred embodiment, distances $d_1$ and $d_2$ are equal whereby cables 104 are parallel. The length of the eye bolts 98, springs 100 and cables 104 are such that when the adjacent span units are at a neutral at-rest position the eye bolts 98 are disposed substantially halfway through holes 96 with the springs 100 in a half compressed mode. This, therefore, allows the eye bolts, springs, and cables 104 to act as extensible members connecting first rigid horizontal bar 86 to second rigid horizontal bar 90 in parallel whereby the members thus comprised can extend and contract under equal tensions in response to the various undesired motions which occur in the junction between the two conduits 18.

To provide the input to the controller 54″, a linkage generally indicated as 106, is provided as is suitable for the controller being employed. For example, when employing a controller such as that shown in 54″ in FIGS. 10 and 11 wherein a control rod 56 is moved into and out of the controller 54 to signify variations in angularity as indicated by the linear arrows 108, linkage 106 can comprise a rigid bar 110 attached to second rigid horizontal bar 90 (as by welding on one end) positioned with the outward end of control rod 56 pivotally attached to the opposite end as shown. Thus, as second rigid horizontal bar 90 is rotated about pivot point 94 by angular displacement between the conduits 18 as indicated by arrow 112, control rod 56 will be inserted into and withdrawn from controller 54" in an amount proportional to the angular displacement to cause the proper signal to be developed within controller 54".

If the distances $d_1$ and $d_2$ are maintained in relative equality such that the eye bolts 98 can move longitudinally freely in holes 96, it can be seen that undesired movements are absorbed in the extensible members comprising eye bolts 98, springs 100 and cables 104. For example, longitudinal movements as indicated by the arrows 36 in FIG. 3 are absorbed equally in the eye bolts 98 and springs 100 as eye bolts 98 move equally through holes 96 in either direction. Likewise, pitching moments are equally absorbed in the springs 100 and eye bolts 98 as equal tension forces are maintained on either side of second rigid horizontal bar 90 through the equal distances $d_2$ whereby no turning force is created thereon. That is, the two forces created in cables 104 at each distances from pivot point 94 are equal and offsetting. Traverse dislocations as indicated by the arrows 40 in FIG. 3 present no rotational force on second horizontal bar 90 since the offset angle of both cables 104 is constant. Finally, roll motion as indicated by the arrow 34 in FIG. 3 is absorbed in a twisting of cables 104 in equal and opposite directions again maintaining equal and opposite force components in the horizontal plane acting on second rigid horizontal bar 90 about pivot point 94. Only angular displacement in the X-Y plane of FIG. 3 (indicated by the arrows 42 thereof) causes a translational change in the control rod 56 with respect to control unit 54" which is proportional to the change in angularity between the two conduits 18.

The span units of a center pivot irrigation system are typically mechanically interconnected in one of the three ways shown in FIGS. 12, 13, and 14. That is, in FIG. 12, the two conduits 18 are interconnected by members 114 and 116 above the center line of the conduits 18. In the version of FIG. 13, conduits 18 are joined by members 114' and 116' along the center lines of conduits 18. That is, the boot 16 passes over members 114' and 116' such that members 114' and 116' are within the waterflow path. In the joining method shown in FIG. 14, members 114" and 116" join conduits 18 below the center line thereof. As will be recognized, the embodiment of the present invention described with reference to FIG. 10 and FIG. 11 employs a below-the-center-line type mechanical connector of the type shown in FIG. 14. A similar construction could be employed with mechanical joining apparatus of the type shown in FIG. 13.

Figure 5:
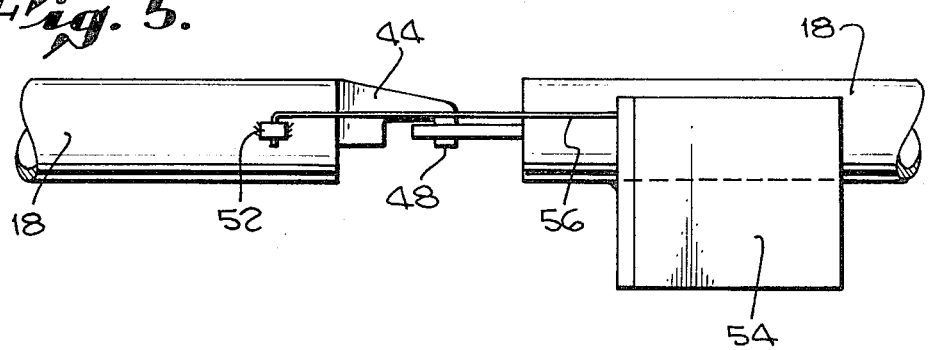
FIG. 5 is a side elevation of the apparatus of FIG. 4.
Figure 6:
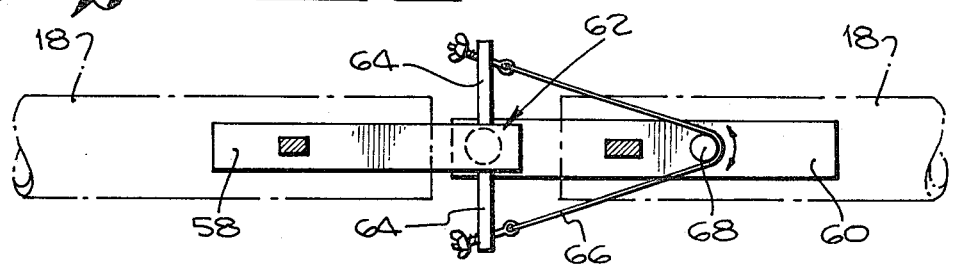
FIG. 6 is a plan view of another type of angularity sensor employed in the prior art.
Figure 7:
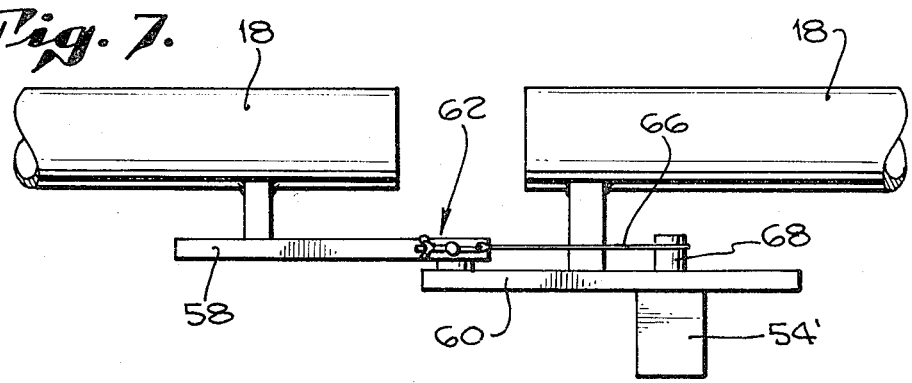
FIG. 7 is a side elevation of the apparatus of FIG. 6.

Referring now to FIGS. 15 and 16, two variations of the present invention are shown employed with mechanical joining apparatus of the type shown in FIG. 12. In both figures, the first rigid horizontal bar 86 is connected directly to member 114. Likewise, second rigid horizontal bar 90 is pivotally mounted to member 116. That is, posts 88 and 92 are eliminated. In the embodiment of FIG. 15, a control unit 54 of the type employed in the apparatus of FIGS. 4 and 5 and that of FIGS. 8 and 9 is employed. That is, the control rod 56 moves longitudinally along a line parallel to the conduits 18. For this embodiment, bar 110 is attached off one end of second horizontal bar 90 as shown to properly move control rod 56 to supply the input to control unit 54. By contrast, when employing a control unit 54" with a lateral moving control rod 56 as employed in the apparatus of FIGS. 10 and 11, bar 110 is mounted in a manner similar thereto. If a controller 54' of the type shown in FIGS. 6 and 7 were to be employed, the cable 66 thereof could be fastened to second rigid horizontal bar 90 whereby second rigid horizontal bar would perform the functions of rigid arms 64 shown in FIGS. 6 and 7.

Thus, it can be seen that the angularity sensor of the present invention is easily adaptable to provide movement of the input device of various known controllers employed in center pivot irrigation systems to provide an input to the controller which is truly a function of only the angularity between adjacent span units and which rejects spurious motion due to roll, traverse movement, pitch, and longitudinal movement of the adjacent span units whose angularity is being sensed.

Wherefore, having thus described my invention, I claim:

1. In a center-pivot irrigation system having a plurality of interconnected span units revolving in articulated relationship about a center pivot with each span unit comprising a water-carrying conduit supported on one end by a wheeled angular deviation in a horizontal plane between the span unit having the motor and the next adjacent span unit, the improved angularity sensor providing an angularity signal to the controller comprising:

(a) a first horizontal rigid bar member attached adjacent one end of the span unit conduit to extend normal to the longitudinal axis of said one span unit conduit equally in opposite directions in the horizontal plane when said one span unit is revolving in a horizontal plane;

(b) a second horizontal rigid bar member rotatably attached at its center adjacent the abutting end adjacent said first rigid bar of the next adjacent span unit conduit to said one span unit conduit for rotation in said horizontal plane and extending normal to the longitudinal axis of said next adjacent span unit conduit equally in opposite directions in said horizontal plane;

(c) a pair of first connecting means for pivotally interconnecting respective ends of said first and second horizontal bar members extending from said span unit conduits in the same direction, said first connecting means holding said first and second horizontal bar members under substantially equal tension forces on each side and being extensible and retractible under equal tension forces; and, (d) second connecting means for interconnecting said second rigid bar member to the movable input of the controller to move the input in proportion to rotational movement of said second bar member corresponding to changes in angular deviation between said two adjacent span units.

2. The angularity sensor for a center-pivot irrigation system of claim 1 and additionally comprising:

said pair of first connecting means including means for adjusting the relative lengths of said first connecting means.

3. In a center-pivot irrigation system having a plurality of interconnected span units revolving in articulated relationship about a center pivot with each span unit comprising a water-carrying conduit supported on one end by a wheeled support tower driven by a motor under the control of a control unit having a movable input connected to be responsive to the angular deviation in a horizontal plane between the span unit having the motor and the next adjacent span unit closer to the center pivot, the improved angularity sensor providing an angularity signal to the controller comprising:
(a) a rotatable horizontal bar member attached to one span unit adjacent the end thereof for horizontal rotation about a pivot point at its center only;
(b) first connecting means operably connected between the movable input of the controller and said rotatable horizontal bar member for providing a mechanical input to the controller proportional to rotation of the rotatable horizontal bar member;
(c) second connecting means operably connected between said rotatable horizontal bar member on one end and to said next adjacent span unit on the other end for rotating said rotatable member only in response to angular deviations in the horizontal plane between the two adjacent span units
(d) said pivot point is disposed to have said rotatable member rotate in said horizontal plane about an axis of rotation passing throuh the longitudinal axis of said one span unit;
(e) said second connecting means comprises a pair of extensible members disposed on opposite sides of the two adjacent spane units, substantially parallel thereto and at substantially equal distances therefrom when the two adjacent span units are in axial alignment;
(f) said rotatable horizontal bar member comprises a longitudinal member extending laterally from said one span unit equally on both sides from said pivot point to a pair of connecting points for said second connecting means disposed on respective ends of said rotatable horizontal bar member and lying in a horizontal plane for rotation therein; and,
(g) each of said pair of extensible members is connected on one end to said next adjacent span unit and to a respective one of said connecting points on the opposite end.

4. The angularity sensor for a center-pivot irrigation system of claim 3 wherein:
each of said extensible members includes means for adjusting the length thereof whereby the position of the angularity sensor can be adjusted.

5. The angularity sensor for a center-pivot irrigation system of claim 3 wherein:
each said extensible members includes means for adjusting a restorative tension force within said member when said member is extended.

6. The angularity sensor for a center-pivot irrigation system of claim 3 wherein:
said extensible members are disposed in a half-extended position when the two adjacent span units are in a neutral position of alignment whereby said extensible members can accomodate being moved longitudinally in either direction and will have a restorative force back to said neutral position.

* * * * *